Figure 1:
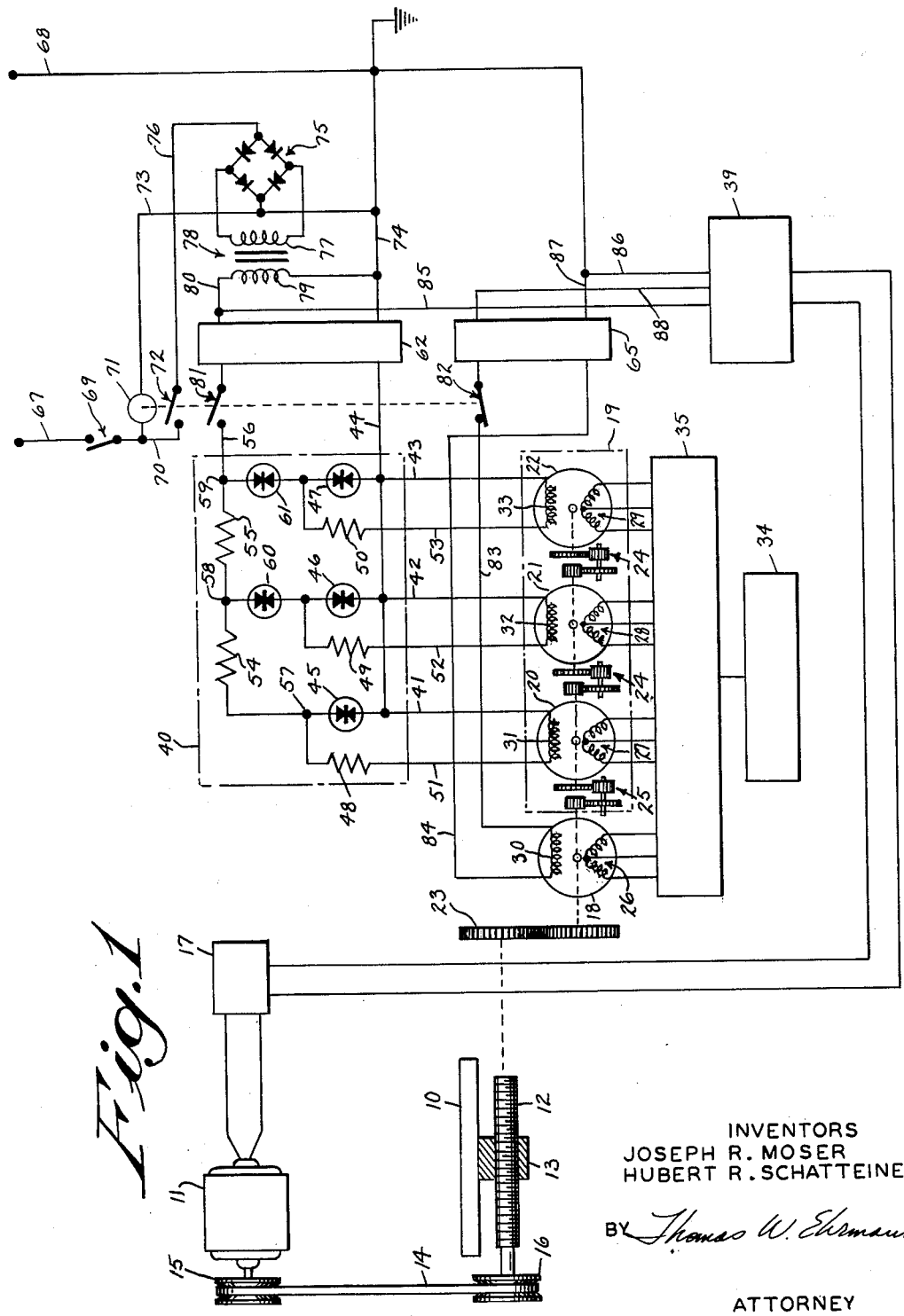

Jan. 19, 1965        J. R. MOSER ETAL        3,166,698
BACKLASH TAKE-UP SYSTEM
Filed Aug. 15, 1962                    2 Sheets-Sheet 1

INVENTORS
JOSEPH R. MOSER
HUBERT R. SCHATTEINER

BY Thomas W. Ehrmann

ATTORNEY

INVENTORS
JOSEPH R. MOSER
HUBERT R. SCHATTEINER

BY Thomas W. Ehrmann

ATTORNEY 3,166,698
BACKLASH TAKE-UP SYSTEM
Joseph R. Moser, Brookfield, and Hubert R. Schatteiner, Milwaukee, Wis., assignors to Allen-Bradley Company, Milwaukee, Wis., a corporation of Wisconsin
Filed Aug. 15, 1962, Ser. No. 217,155
5 Claims. (Cl. 318—28)

This invention relates to a backlash take-up system for a servomechanism, and particularly resides in a backlash take-up system for a feedback control system adapted to position an object and which utilizes position error detectors responsive to movements of the object to control the positioning of the object at a point offset from and always to the same one side of the final desired position of the object, and which includes a final positioning error detector adapted to position the object at the final desired position after the offset position has been reached and thereby to insure that the approach of the object to the final desired position takes place from one direction only.

Position control systems which employ the principle of feedback have found considerable use in controlling elements of a machine tool. Such control systems generally include a drive for a mechanical element, such as a lead screw, which moves the machine tool element to a desired position upon command. Control of the drive for the mechanical element is normally accomplished by a plurality of position error detectors which, although they may take several forms, are commonly alternating current type linear or rotary induction devices, generally termed synchros. A common form of a feedback control system employs a plurality of rotary synchros each having primary and secondary windings wound about rotor and stator members and with the rotor members mechanically coupled to each other and to the mechanical element which moves the machine tool element. The result is that the angular displacement of the rotor member with respect to the stator member of each synchro is in a fixed relation to the linear movement of the machine tool element being controlled.

Command information concerning a programed position for the machine tool element is introduced in the system as voltages in terms of the relative angular position between stator and rotor members which will result when the programed position has been reached, and such voltages are impressed on the windings of either the stator or rotor member of each rotary synchro. Then, annular displacement of the rotor members, which are controlled by the position of the machine tool element, give rise to error voltages which are employed to control the degree and direction of movement of the mechanical element by the drive. When the error voltage is zero, the object has been brought to its programed position.

A plurality of rotary synchros, each having its respective zone of control, are used successively as the object travels towards the programed position to obtain greater accuracy and precision in positioning of the machine tool element. Necessarily, means are provided to transfer the control of the drive from relatively coarse control synchros to finer control synchros as positional disagreement decreases.

Even with the precautions taken to insure that the extreme requirements for accuracy in positioning are met, inaccuracies do arise and a principal cause is found in the mechanical drive for the machine tool element and the mechanical coupling between rotary synchros. For example, if the machine tool table is the element being positioned, the lead screw which operates in a nut secured to the machine tool table will necessarily have a certain amount of clearance between its threads and the threads on the nut. Since control systems of the type being described are called upon to control the approach to a programed position from both sides, a substantial error is introduced into the accuracy of the control system because of the mechanical backlash of the lead screw and other necessary gearing. Not only will a slight degree of backlash cause inaccuracies in the positioning of the machine tool element, but it may also render the system unstable.

Elimination of the inaccuracies attendant with the presence of mechanical backlash may be accomplished by insuring that final positioning of the machine tool element will always be accomplished from one direction only. Accordingly, the backlash take-up system of this invention is adapted to insure such single direction final positioning of the machine tool element. This is accomplished by employing a succession of primary induction devices which position the machine tool element at an offset point, which offset point is always to the same side of the final desired point. Then, control of the drive is transferred to a final positioning synchro which, although mechanically coupled to the machine tool element and to the succession of primary induction devices, is electrically independent thereof and operates only after the succession of primary induction devices has positioned the machine tool element at the offset position. This final positioning synchro controls the movement of the machine tool element from the offset position to the programed position. In this manner, final positioning is always accomplished from the same side and, therefore, the same side of the lead screw threads is employed and the effects of backlash are prevented from entering into the system.

Previous systems directed to the problem of eliminating mechanical backlash from the control system have employed specific forms of error detectors which yielded a constant, inflexible offset distance. The system of this invention is unlimited in the type of error detector which may be employed and further permits of adjustment of the offset distance.

Accordingly, it is a principal object of this invention to provide a backlash take-up system which eliminates inaccuracies attendant with the presence of mechanical backlash.

It is also an object of this invention to provide a backlash take-up system for an object position control system and which causes final positioning of the object to be accomplished from one side only by initially positioning the object at an offset position and then controlling the positioning of the object from the offset position to a final programed position.

It is a further object of this invention to provide such a backlash take-up system which is not limited to employing particular forms of error detectors, and which permits adjustment of the distance between the offset and final programed positions.

The foregoing and other objects of this invention will appear in the description to follow. In the description reference is made to the accompanying drawings which form a part hereof and in which there is shown by way of illustration a specific form in which this invention may be practiced. This form will be described in detail to enable those skilled in the art to practice this invention but it is to be understood that other embodiments of the invention may be used and that changes in the embodiment described may be made by those skilled in the art without departing from the true scope of the present invention. Consequently, the following detailed description is not to be taken in a limiting sense and the scope of the present invention is best defined by the appended claims.

Figure 2:
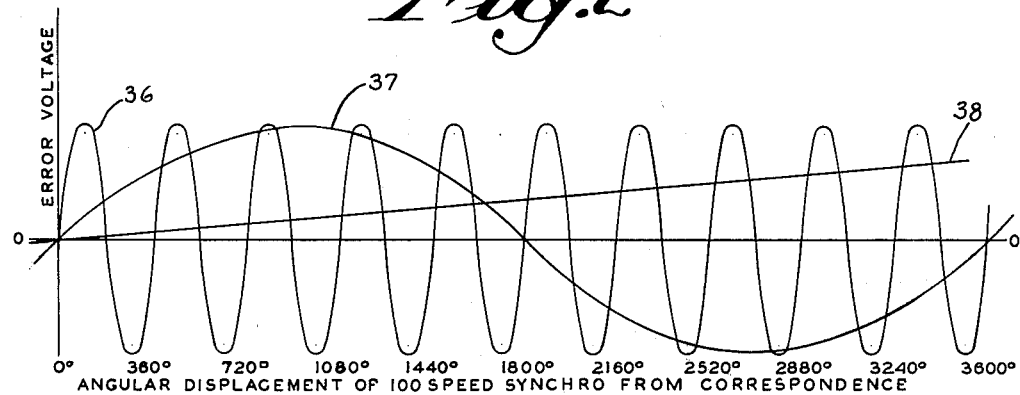
Figure 3:
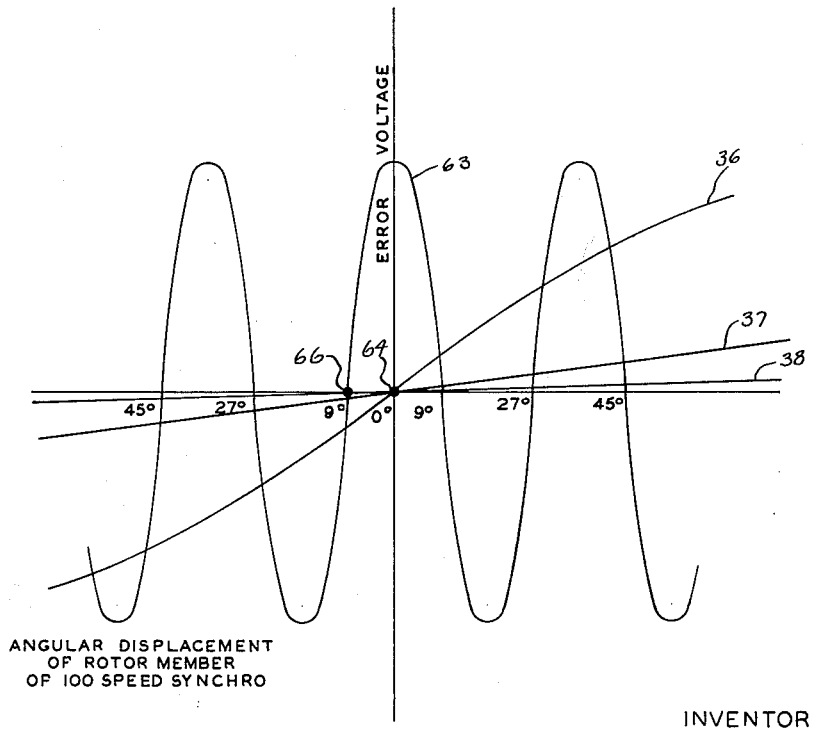

In the drawings:

FIG. 1 is a schematic diagram of a control system embodying the invention,

FIG. 2 is a chart of the loci of the peaks of the voltage output of the synchros employed in the system of FIG. 1 with respect to position plotted, positive when in phase with the source or supply voltage and negative when 180° out of phase with the source or supply voltage, and FIG. 3 is an enlarged portion of the chart of FIG. 2 and illustrating the operation of the backlash take-up system of this invention.

The backlash take-up system of this invention is adapted for use in a feedback control system which may be provided with positioning mechanism which includes meshing screw or gear teeth, and has particular adaptability to machine tool control systems of the type illustrated in FIG. 1. In FIG. 1, the control system is adapted to accurately and precisely position a work table 10 of a machine tool. While the invention will be described as controlling the positioning of the work table 10, it is to be understood that the system has equal adaptability to the control of the positioning of any machine tool element and, in fact, is not limited to employment with machine tools.

Physical positioning of the table 10 is accomplished by a drive which includes a D.C. shunt type motor 11 mechanically connected to a lead screw 12 which operates in a nut 13 securely affixed to the table 10. The lead screw 12 is rotatably supported by the base of the machine tool (not shown) so that it is stationary relative to the table 10, and will affect movement of the table 10 as it is rotated by the motor 11. The mechanical connection between the motor 11 and the lead screw 12 may take the form of a pulley and belt arrangement in which a belt 14 is driven by a pulley 15 mounted on the output shaft of the motor 11 and drives a pulley 16 mounted on the lead screw 12. The direction of drive of the motor 11, and consequently the direction of linear movement imparted to the table 10 by the lead screw 12, is controlled by a motor control circuit of conventional design and illustrated schematically in FIG. 1 as a motor control unit 17. It is the function of the position control system to control the input to the motor control unit 17.

The position control system illustrated includes error detectors which are mechanically coupled to the lead screw 12. The error detectors include a final positioning rotary induction device or rotary synchro 18 and an error detector unit 19 comprising three preliminary positioning rotary synchros 20, 21 and 22. The rotor member of the final positioning synchro 18 is mechanically connected to the lead screw 12 through suitable gearing 23 whereby the angular displacement of the rotor member of the synchro 18 relative to its stator member is in a fixed relation to the linear travel of the table 10. In the system illustrated, the ratio of the gearing 23 is such that the rotor member of the synchro 18 makes one complete revolution for each 0.1 inch of travel of the table 10. The successive adjacent preliminary positioning synchros 20, 21 and 22 are mechanically connected by gearing 24 generally of identical ratio, as for example, 10:1, and the rotor member of the final positioning synchro 18 is connected to the preliminary positioning synchros 20, 21 and 22 by similar gearing 25. Thus, for each revolution of the rotor member of the synchro 22, the rotor members of the synchros 21, 20 and 18 will make 10, 100 and 1000 revolutions, respectively. The synchros 18, 20, 21 and 22 may, therefore, be characterized as the 1000-speed, 100-speed, 10-speed and 1-speed synchros, respectively.

Each synchro 18, 20 21 and 22 includes a dual element primary winding 26, 27, 28 and 29, respectively, with the two elements spaced 90° apart, and a secondary winding 30, 31, 32 and 33, respectively. Either winding of each synchro may be mounted on a stator member and the other on a rotor member. It will be assumed for discussion that the secondary winding of each of the synchros is mounted on a rotor member.

Programed information concerning the desired, preselected position of the table 10 is fed to the control system in any of a number of conventional manners such as by use of rotary switches, push button keyboards, or punched tape readers. The form of input data unit employed forms no part of this invention, and therefore, the input information is illustrated schematically in FIG. 1 as being related from a command unit 34. The programmed information is then translated into voltage signals which can be imposed across each of the two elements of the primary windings 26, 27, 28 and 29 of the synchros. The voltages imposed across such primary windings may be produced by input signal means in the form of a digital to analog converter 35, of conventional design and known operation, and which includes a series of transformers which may be tapped at various points at the direction of the command unit 34 to produce output voltages for representing shaft positions of the rotors, and wherein the analog information is in terms of the sine and cosine of the angular shaft positions of the resolvers 18, 20, 21 and 22 which will yield the desired position of the table 10. The voltages thus produced are placed across the elements of the primary windings so that, were it not for an adjustment hereinafter described, when the preselected position of the table 10 is reached, the error voltages induced in the secondary windings 30, 31, 32 and 33 of the synchros will be zero, if the lack of precision of the digital to analog converter 35, discussed hereafter, is disregarded.

A plurality of conventional command synchros which are identical to the synchros 18, 20, 21 and 22 may be employed as the input signal means in place of the digital analog converter 35. When such command synchros are employed, the command unit 34, in effect, positions the rotor windings of the command synchros relative to the stator windings thereof so that voltages identical to those produced by the digital to analog converter 35 are imposed in the primary windings of the synchros.

The preliminary positioning synchros 20, 21 and 22 function, in the backlash take-up system of this invention, to control the positioning of the machine tool table 10 to an offset point. However, in a position control system which is not provided with the backlash take-up system of this invention, these synchros would be employed to control the positioning of the table 10 to the final preselected position and it will facilitate an explanation of other standard elements of the feedback circuit if it is assumed that the preliminary positioning synchros 20, 21 and 22 are so employed. Consequently, the presence of the final positioning synchro 18 as well as other elements comprising the backlash take-up system will be initially ignored.

The alternating error voltage induced in each of the secondary windings 31, 32 and 33 of the preliminary positioning synchros varies with the position of the rotor member relative to the stator members of each, and the values of the maximum voltages that may be induced will attain a peak value and decrease to zero value twice in each revolution of the rotor member. For one-half revolution, the error voltage will have an in-phase relation with the supply voltage impressed across the associated primary windings 27, 28 and 29, and for the other half revolution the error voltage will be in phase reversal with respect to the supply voltage. The values of maximum induced error voltages present an envelope that varies sinusoidally with rotational position. When the error voltage is in phase with the supply voltage a plot of such in-phase error voltages is represented by a positive half cycle of a sinusoidal curve of FIG. 2, and when the error voltage is in phase reversal with the supply voltage a plot of such error voltages is represented by a negative half cycle of a sinusoidal curve of FIG. 2.

In FIG. 2 the abscissa represents angular displacement in degrees of the rotor wound secondary winding 31 of the 100-speed synchro 20 and the ordinate represents the error voltage induced in the secondary windings 31, 32 and 33. A sinusoidal curve 36 for the secondary winding 31 of the 100-speed synchro 20 completes one cycle for each 360° rotation of the rotor member of such synchro 20. Since the rotor member of the 10-speed synchro 21 makes one complete revolution for each ten revolutions of the rotor member of the 100-speed synchro 20 due to the gear ratio of 10:1 of the gearing 24, a sinusoidal curve 37 for the 10-speed synchro 21 completes one cycle for each ten cycles of the curve 36. Similarly, each cycle of a sinusoidal curve 38 for the 1-speed synchro 22 encompasses ten cycles of the curve 37 and, therefore, encompasses one hundred cycles of the curve 36. A complete cycle of the curve 38 is not shown because of the abscissa scale employed. A similar sinusoidal curve could be plotted for the error voltage induced in the final positioning synchro 18 but has been omitted from FIG. 2 for reasons that will appear hereafter.

From FIG. 2 it can be seen that if the positional disagreement between the actual position and the desired preselected position is substantial, that is if the rotor member of the 100-speed synchro 20 would require more than 180° of rotation before the table 10 would reach the desired position, the 100-speed synchro 20 could not be employed to control the motor 11. This results from the action of a phase discriminator 39 which receives error voltages and produces a polarized D.C. output. The phase discriminator 39, when supplied with an error voltage which falls in the negative half cycle of the curve 36 will produce a D.C. output of one polarity and thereby cause the motor 11 to drive in one direction, and when supplied with an error voltage which falls in the positive half cycle of the curve 36 will produce a D.C. output of the opposite polarity and thereby cause the motor 11 to drive in an opposite direction. Thus, if the 100-speed synchro 20 would require more than 180° of rotation, the envelope of the error voltage output of the secondary winding 31 would follow the curve to a zero value at a point 360° away from the proper position of the rotor member of the synchro 20 and this would result in a false position for the table 10. Therefore, each synchro has its individual zone of control which is about one-half cycle of its respective sinusoidal curve and control of the motor 11 by the output of the discriminator 39 must be transferred from one preliminary positioning synchro to the next higher speed synchro within the zone of control of such higher speed synchro.

In the system being described, the gearing 24 and 25 is such that the rotor member of the final positioning synchro 18 makes one complete revolution for each 0.1 inch linear travel of the table 10 and the rotor member of the 1-speed resolver 22 will then make one complete revolution for each 100 inches of linear travel of the table 10. The zone of control of the 1-speed synchro 22 is limited, therefore, to one-half cycle of its sinusoidal curve 38 or to a 50 inch linear movement of the table 10. The effective zones of control for the remaining preliminary positioning synchros 20 and 21 correspond to 0.5 inch and 5 inches, respectively. Thus, the 1-speed synchro 22 is employed when the positional disagreement exceeds 5 inches and consecutively higher speed synchros are employed as the positional disagreement decreases.

A voltage switching circuit is employed to perform the function of transferring control from one to another of the preliminary positioning synchros within their respective zones of control. The voltage switching circuit may take the form of a static switch circuit 40 which is fully disclosed and described in the copending application of Lynn H. Matthias and Odo J. Struger for "Static Switch for Multi-Speed Error Detector Control System," Serial No. 165,636, filed January 11, 1962, and assigned to the assignee of this invention. One lead 41, 42 and 43 of the secondary windings 31, 32 and 33, respectively, are connected together by an output lead 44 of the static switch circuit 40. Such leads 41, 42 and 43 are each connected to one side of voltage limiting non-linear conductors preferably in the form of double anode or symmetrical zener diodes 45, 46 and 47, respectively.

Protecting resistors 48, 49 and 50 are connected to the remaining leads 51, 52 and 53, respectively, of the secondary windings 31, 32 and 33, and each protecting resistor connects with the other side of a respective double anode zener diode 45, 46 and 47. An error voltage controlling circuit which includes a protecting resistor and a non-linear conductor connected in series is, therefore, provided across the output leads of each of the secondary windings 31, 32 and 33.

The static switch circuit 40 further includes a resistive summing circuit comprising a pair of resistors 54 and 55 connected in series and terminating at one end in a second output lead 56 of the static switch circuit 40. The opposite end of the summing circuit is joined at a junction point 57 with the voltage controlling circuit comprising the resistor 48 and the double anode zener diode 45. The summing circuit is also connected to each of the remaining voltage controlling circuits at junction points 58 and 59 and, as seen in FIG. 1, each of these connections is made intermediate the resistor and double anode zener diode of the respective controlling circuit. Blocking non-linear conductors preferably in the form of double anode zener diodes 60 and 61 are placed in the connections of the voltage controlling circuits of the synchros 21 and 22, respectively, with the summing circuit.

Each of the limiting double anode zener diodes 45, 46 and 47 limit the error voltage output of the synchros which is transmitted to the summing circuit to a level which cannot be exceeded. For example, the voltage across the junction point 57 and the output lead 44 will be clipped to a level equal to the sum of the breakdown voltage and forward voltage drop across the double anode zener diode 45. Therefore, regardless of the alternating error voltage induced in the secondary winding 31, the voltage produced by the secondary winding 31 across the output leads 44 and 56 of the static switch circuit 40 will not exceed the sum of the breakdown voltage and forward voltage drop of the double anode zener diode 45 less the voltage drops across each of the resistors 54 and 55 of the summing circuit.

Each of the blocking double anode zener diodes 60 and 61 has the effect of decreasing the amplitude of error voltage of its synchro 21 and 22 by an amount about equal to its breakdown voltage. The net result is that each of the sinusoidal curves 37 and 38 are adjusted by an amount equal to the breakdown voltage plus the forward voltage drop of the double anode zener diode 60 and 61, respectively. In other words, each of the positive half cycles of the sinusoidal curves 37 and 38 are adjusted downwardly by such amount and each of the negative half cycles are adjusted upwardly by such amount. The resulting adjusted sinusoidal curves will each have a null zone or region of zero error voltage which encompasses the point of correspondence. The purpose of providing such a null zone is to prevent a false point of correspondence which may result from the lack of precision of the digital to analog converter 35 and misalignment of the rotor members of the synchros. Such lack of precision may result in the zero transition, equivalent to zero induced error voltage, being somewhat different for each synchro in that at the point of correspondence of a higher speed synchro there may exist some output voltages of the lower speed synchro. It should be noted that a blocking double anode zener diode is not used for the secondary winding 31 of the 100-speed synchro 20 since it is necessary that the curve 36 pass sharply through zero to obtain high resolution for positioning about the point of correspondence of the 100-speed synchro 20.

The error voltages fed to the output leads 44 and 56 of the static switch circuit 40 by the preliminary positioning synchros 21 and 22 are limited by the limiting double anode zener diodes 46 and 47 and by the blocking double anode zener diodes 60 and 61. For example, the error voltage imposed across the output leads 44 and 56 by the 10-speed synchro 21 will be limited to a level equal to the breakdown voltages plus the forward voltage drop of the limiting double anode zener diode 46 less the breakdown voltage and forward voltage drop of the blocking double anode zener diode 60 and less the voltage drops across the resistor 55 of the summing circuit.

To facilitate an understanding of the general operation of the static switch circuit 40, let it be assumed that it is desired to move the machine tool table 10 to a new position which is more than five inches away from its present position. Voltages will be imposed by the digital to analog converter 35 across the primary windings 27, 28 and 29 of each of the preliminary positioning synchros 20, 21 and 22 which are in terms of the sine and cosine of the angular shaft positions of the rotor members of the synchros which will yield the desired position of the table 10. Alternating error voltages are thereby induced in the secondary windings 31, 32 and 33. Under the assumed conditions, the positional difference is within the zone of control of the 1-speed synchro 22 only, and it must control the output of the static switch circuit 40 to avoid false positioning as hereinbefore described. Although the alternating error voltage induced in the secondary winding 33 of the 1-speed synchro 22 may be greater or less than the alternating error voltages simultaneously induced in the secondary windings 31 and 32, the voltages applied across the output leads 44 and 56 by the 100-speed synchro 20 and by the 10-speed synchro 21 will be limited, as described above, and the level of such voltages will not exceed the voltage applied across the output leads 44 and 56 by the 1-speed synchro 22. Therefore, the voltage applied across the output leads 44 and 56 by the 1-speed synchro 22 will be at least as great as the voltages applied thereacross by the higher speed synchros and the voltage induced in the secondary winding 33 of the 1-speed synchro 22 will control the output voltage of the static switch circuit. The output voltage of the static switch circuit 40 ultimately controls the driving of the motor 11 and, therefore, the table 10 is moved toward the desired position.

As the positional difference decreases due to the movement of the table 10 toward the desired position, the error voltage induced in the secondary winding 33 of the 1-speed synchro 22 will decrease to a level less than the breakdown voltage of the limiting double anode zener diode 47, and ultimately, the voltage applied across the output leads 44 and 56 by the 10-speed synchro 21 will be greater than the voltage applied thereacross by the 1-speed synchro 22. This will occur within the zone of control of the 10-speed synchro 21 and the 10-speed synchro 21 will then control the output voltage of the static switch circuit 40 and the driving of the motor 11. As the table 10 continues to move toward the desired position the control of the output voltage of the static switch circuit 40 is transferred to the 100-speed synchro 20. At the desired position, the error voltage induced in the secondary winding 31 is zero and the blocking double anode zener diodes 60 and 61 insure that the error voltages fed to the output leads 44 and 56 by the synchros 21 and 22 is also zero.

In such manner control of the drive of the motor 11 is transferred from low speed synchros to successively higher speed synchros as the positional disagreement decreases, and such transfer of control is accomplished within the zone of control of each synchro.

The alternating error voltage which is produced at the output leads 44 and 56 of the static switch circuit 40 is fed in a manner hereinafter described, through an amplifier 62 to the phase discriminator 39 which determines the phase of the alternating error voltage with respect to the supply voltage and produces a direct voltage having a polarity which corresponds to the direction of error. Such direct voltages are fed to the motor control unit 17 to control the driving of the motor 11. The amplifier 62 and discriminator 39 may be of conventional design and operation and their construction forms no part of the present invention.

When the output voltage of the static switch circuit 40 is zero and the corresponding voltage supplied to the motor control unit 17 by the discriminator 39 is also zero, the lead screw 12 has been rotated in the proper amount and direction to cause the rotor members of the preliminary positioning synchros 20, 21 and 22 to rotate to a point of correspondence. If such synchros were employed to position the table 10 at the final desired position, the table 10 should theoretically have been positioned at the desired position. However, the presence of mechanical backlash in the cooperating lead screw 12 and nut 13 and in the gearing connecting the synchros may result in a false position of the table 10. Backlash may be defined as the amount by which the tooth space exceeds the thickness of an engaging tooth. The presence of mechanical backlash gives rise to a zone of lost motion where, for example, the rotation of the lead screw 12 will produce no corresponding movement of the table 10. For example, if the table 10 has previously been moved to the left relative to FIG. 1, the clearance will lie to the right of the teeth of the lead screw 12. If it is then desired to move the table 5 to the right relative to FIG. 1, it is necessary for the lead screw 12 to move in excess of the normal movement to overcome such lost motion. In the control system the angular positions of the rotor members of the synchros 20, 21 and 22 are determined by the movement of the lead screw 12 and not by the position of the table 10, and there is no compensation for such lost motion.

To overcome the problem of false positioning resulting from the presence of mechanical backlash, the table 10 is initially moved to a preliminary offset point under the control of the preliminary positioning synchros and the offset point is always to the same side of the desired final position. Then, after being brought to the preliminary offset point, the table 10 is moved to the desired final position under the control of the final positioning synchro 18. In FIG. 3, the manner of achieving first a preliminary offset point and then the final position is illustrated by use of the sinusoidal error voltage curves. FIG. 3 shows a portion of the sinusoidal curves 36, 37 and 38 of FIG. 2 to an enlarged scale together with a similar sinusoidal curve 63 for the error voltage induced in the secondary winding 30 of the final positioning synchro 18.

The system is adjusted initially so that the preliminary positioning synchros produce zero error voltage output at an offset point. While the adjustment may be accomplished by changing the reference position for the command information fed to the digital to analog converter 35 by an amount equal to the distance between the offset point and the desired final position, it is preferred to accomplish the adjustment by physically displacing the stator members of the preliminary positioning synchros 20, 21 and 22 from reference an amount equivalent to the offset distance desired. In the system being described, let it be assumed that the desired offset distance is 0.025 inch since this corresponds to an angular rotation of 90° or one-quarter cycle of a full rotation of the final positioning synchro 18. Because of the ratio of 10:1 in the gearing 24 and 25, the stator of the 100-speed synchro 20 would be displaced 9°, the stator of the 10-speed synchro 21 would be displaced 0.9°, and the stator of the 1-speed synchro 22 would be displaced 0.09° from reference.

Once the adjustment has been made, the error voltages induced in the secondary windings 31, 32 and 33 of the preliminary positioning synchros will cause the table 10 to be moved to an offset position represented by a point 64 in FIG. 3. The point 64 is the equivalent shaft position of the rotor members of the preliminary positioning synchros 20, 21 and 22 which will yield the offset position of the table 10. When the offset position has been reached, control of the motor 11 is transferred to the final positioning synchro 18 by switching means hereinafter described. Since it has been assumed that the angular adjustment to the preliminary positioning synchros amounted to 90° of rotation of the final positioning synchro 18, the sinusoidal curve 63 would be displaced from the sinusoidal curve 36 of the 100-speed synchro 20 a distance of 9° because of the abscissa scale employed, as shown in FIG. 3. It will be noted that the final positioning synchro 18 exhibits an output error voltage when the error voltages of the preliminary positioning synchro are zero, and when control is transferred to the final positioning synchro 18 such error voltage is fed through a second amplifier 65 to the discriminator 39. Thus, the table 10 is moved to the desired final position represented by a point 66 in FIG. 3. The point 66 is the equivalent shaft position of the rotor of the final positioning synchro 18 which will yield the desired final position of the table 10, and at which the error voltage induced in the secondary winding 30 is zero.

The switching means obtains its initial power from a D.C. source which is imposed across a pair of input conductors 67 and 68, with one conductor 68 being grounded. The other input conductor 67 is connected to one side of a master switch 69, and the opposite side of the master switch 69 is connected through a conductor 70 to one side of the coil of a control relay 71 and to one side of a normally open first relay switch 72. The other side of the relay coil 71 is connected by a conductor 73 to an output lead 74 of the first amplifier 62 and this output lead 74 connects with the grounded input conductor 68. The second side of the first relay switch 72 is connected to an output corner of a full wave bridge rectifier 75 by a conductor 76. The other output corner of the bridge rectifier 75 is connected to the conductor 73, and the input corners thereof are connected to opposite ends of a secondary winding 77 of a transformer 78. The primary winding 79 of the transformer 78 is connected across the output lead 74 and a second output lead 80 of the first amplifier 62.

A normally open second relay switch 81 of the control relay 71 is placed in the connection of the output lead 56 of the static switch circuit 40 to the first amplifier 62. A third relay switch 82 has a normally closed position in which it connects a conductor 83 leading from one end of the secondary winding 30 of the final positioning synchro 18 to the second amplifier 65. The other end of the secondary winding 30 is also connected to the second amplifier 65 through a conductor 84.

The phase discriminator 39 is connected to the output of both of the amplifiers 62 and 65. Specifically, the discriminator 39 is connected to the output lead 80 of the first amplifier 62 by a conductor 85 and is connected to the second output lead 74 through a conductor 86 connected to the grounded input conductor 68 which, as described above, connects with the lead 74. The conductor 86 also connects the discriminator 39 to one output lead 87 of the second amplifier 65 and a second output lead 88 thereof is likewise connected to the discriminator 39. The output of the phase discriminator 39 is fed to the motor control unit 17.

At the start of a positioning operation, the master switch 69 is closed only momentarily, either manually or automatically under the direction of the command unit 34. Closing of the master switch 69 energizes the coil of the control relay 71 which has the effect of closing the normally open second relay switch 81 and opening the normally closed third relay switch 82. Thus, error voltages induced in the secondary windings 31, 32 and 33 of the preliminary positioning synchros will be fed to the static switch circuit 40 and then through the first amplifier 62.

At the same time, the circuit from the final positioning synchro 18 to the second amplifier 65 is interrupted. Therefore, the phase discriminator 39 will receive signals only from the first amplifier 62 and the preliminary positioning synchros will control the movement of the table 10.

Energization of the relay 71 will also close the normally open first relay switch 72 to connect a self-sustaining circuit across the coil of the relay 71. When the static switch circuit 40 is permitted to feed output voltages to the first amplifier 62 by the closing of the relay switch 81, voltages will appear across the output leads 74 and 80 of the first amplifier 62 thereby imposing a voltage on the primary 79 of the transformer 78. A voltage will be induced in the secondary winding 77 of the transformer and this will result in a D.C. voltage appearing across the output corners of the bridge rectifier 75. Since the master switch 69 opens immediately after initially energizing the control relay 71, the relay 71 is held energized thereafter by the direct current output of this self-sustaining closed circuit. Thus, the master switch 69 is not required after its initial closing and must reopen shortly after its initial closing.

When the voltage output of the static switch circuit 40 is zero, indicating that the offset point has been reached, the control relay 71 will be deenergized since the master switch 69 will have opened and there is no longer an input voltage to the bridge rectifier 75. De-energization causes the second relay switch 81 to return to its normally open condition thereby removing the static switch circuit 40 from control of the discriminator 39. At the same time, control of the discriminator 39 is transferred to the final positioning synchro 18 by the return of the third relay switch 82 to its normally closed position.

When control of the driving circuit means, which includes the discriminator 39 and motor control unit 17, is transferred to the final positioning synchro 18, an error voltage will be fed to the discriminator 39 through the amplifier 65 since the error voltage induced in the final positioning resolver 20 is maximum. The error voltage fed to the discriminator 39 by the final positioning synchro will fall in a positive half cycle of the sinusoidal curve 63 and the discriminator 39 will produce a direct current voltage having the proper polarity to cause the motor 11 to drive the table 10 to the final desired position 66. The polarity of the direct current voltage produced by the discriminator 39 will always be the same for error voltages fed thereto by the final positioning synchro 18 and, therefore, the table 10 will always be moved in the same direction from the offset point to the desired final position. When the final position has been reached, the error voltage induced in the secondary winding 30 of the final positioning synchro 18 will be zero and the voltage fed to the discriminator 39 will be zero. Although the preliminary positioning synchros 20, 21 and 22 will exhibit error voltages when the table 10 is at the final desired position, such error voltages cannot be fed to the discriminator 39 since the second relay switch 81 is in its normally open condition. Once the desired final position has been reached, the switching means is ready for the next positioning demand.

Referring to FIG. 3, it will be noted that transfer from the preliminary positioning synchros to the final positioning synchro may theoretically be accomplished within the entire positive half cycle of the sinusoidal curve 63, which is the zone of control of the final positioning synchro 18. As a practical matter, however, control is preferably transferred within the middle 60° of rotation of the half cycle of the curve 63 to guard against inaccuracies. Within this practical range, the stators of the preliminary positioning synchros may be adjusted as desired and, therefore, the offset distance may be adjusted within the range of from 0.0167 inch to 0.0333 inch.

With the backlash take-up system of this invention, regardless of the direction of approach of the table 10, the table 10 will always be positioned at an offset point which is to one side of the final desired position. Thereafter, the table will always be driven in the same direction from the offset position to the final programed position. This is accomplished without resort to specific types of error detectors. For example, a linear induction device may be employed as the final positioning error detector. Not only will the system of this invention eliminate the effects of mechanical backlash, it will also eliminate other inaccuracies in a control system and is effective when it is desired to move the table 10 only a very slight distance since the backlash system always moves the table 10 in an amount at least equal to the offset distance.

We claim:

1. In an object position control system, the combination comprising: input signal means adapted to produce input voltages indicative of a selected position for the object; a preliminary positioning induction device having input windings connected to said input signal means to receive said input voltages and an output winding that is inductively coupled to the input windings, one of the output winding and the input windings being movable with respect to the other in response to movement of the object; driving circuit means for said object connected to the output winding of said preliminary positioning induction device and to which error voltages induced in such output winding are fed; said preliminary positioning induction device yielding zero error voltage at a position of the object offset from a preselected final position thereof, said offset position being always to the same one side of said final position; a final positioning induction device having input windings connected to said input signal means to receive said input voltages and a single output winding adapted for connection to said driving circuit means and that is inductively coupled to the input windings, one of the output winding and the input windings being movable with respect to the other in response to movement of the object, said final positioning induction device having a higher rate of change of error voltage induced in its output winding relative to movement of the object than said preliminary positioning induction device, said final positioning induction device yielding zero error voltage at said preselected final position of said object; and means adapted to break the connection between the output winding of said preliminary positioning induction device and said driving circuit means and to complete the connection between the output winding of said final positioning induction device and said driving circuit means when the object has been moved to the offset position.

2. In an object position control system, the combination comprising: input signal means adapted to produce input voltages indicative of a preselected final position for the object; a preliminary positioning induction device having input windings connected to said input signal means to receive said input voltages and an output winding that is inductively coupled to the input windings, one of the output winding and the input windings being movable with respect to the other in response to movement of the object; driving circuit means for said object adapted for connection to the output winding of said preliminary positioning induction device and to which error voltages induced in such output winding may be fed; the input windings of said preliminary positioning induction device being adjusted relative to the output winding to yield zero error voltage at a position of the object offset from said preselected final position and to one side thereof; a final positioning induction device having input windings connected to said input signal means to receive said input voltages and a single output winding that is inductively coupled to the input windings and relatively movable with respect to the input windings in response to movement of the object, one of the output winding and the input windings being mechanically coupled with the corresponding winding of said first preliminary positioning induction device whereby said final positioning induction device has a relatively higher rate of change of error voltage induced in its output winding relative to movement of the object, the output winding of said final positioning induction device being adapted for connection to said driving circuit means and yielding zero induced error voltage at said preselected final position; and means adapted to connect the output winding of said preliminary positioning induction device to said driving circuit means until the object has been moved to the offset position and adapted to break the connection between said output winding of said preliminary position induction device and said driving circuit means and to connect the output winding of said final positioning induction device and said driving circuit means when the error voltage induced in the output winding of said preliminary induction device is zero for movement of the object always in the same direction to said preselected final position under control of said final positioning induction device.

3. In an object position control system, the combination comprising: input signal means adapted to produce input voltages indicative of a selected position for the object; a succession of preliminary positioning induction devices each having input windings connected to said input signal means to receive said input voltages and an output winding that is inductively coupled to the input windings, one of the output winding and the input windings of each being movable with respect to the other in response to movement of the object, said preliminary positioning induction devices having successively different rates of change of error voltage induced in their output windings relative to movement of the object; an error voltage switching circuit for the output windings of said preliminary positioning induction devices and adapted to produce output voltages which are controlled by the error voltages induced in such output windings, said voltage switching circuit yielding zero output voltage at a position of the object offset from a preselected final position thereof, said offset position being always to the same one side of said final position; driving circuit means for the object connected to said voltage switching circuit and to which the output voltages of said voltage switching circuit are fed; a final positioning induction device having input windings connected to said input signal means to receive said input voltages and a single output winding adapted for connection to said driving circuit means and that is inductively coupled to the input windings, one of the output winding and the input windings being movable with respect to the other in response to movement of the object, said final positioning induction device having the relatively highest rate of change of error voltage induced in its output winding relative to movement of the object, said final positioning induction device yielding zero error voltage at said preselected final position of said object; and means adapted to break the connection between said voltage switching circuit and said driving circuit means and to complete the connection between the output winding of said final positioning induction device and said driving circuit means when the object has been moved to the offset position.

4. In an object position control system, the combination comprising: input signal means adapted to produce input voltages indicative of a preselected final position for the object; a succession of preliminary positioning induction devices each having input windings connected to said input signal means to receive said input voltages and an output winding that is inductively coupled to the input windings and relatively movable with respect to the input windings in response to movement of the object, said preliminary positioning induction devices having successively different rates of change of error voltage induced in their output windings relative to movement of the object; an error voltage switching circuit for the output windings of said preliminary positioning induction devices and adapted to produce output voltages which are controlled by the error voltages induced in such output windings, said preliminary positioning induction devices being adjusted to yield zero error voltage at a position of the object offset from said preselected final position and to one side thereof and thereby to produce zero output voltage of said voltage switching circuit at the offset position; driving circuit means for the object adapted for connection to said voltage switching circuit and to which the output voltages of said voltage switching circuit are fed; a final positioning induction device having input windings connected to said input signal means to receive said input voltages and a single output winding that is inductively coupled to the input windings and relatively movable with respect to the input windings in response to movement of the object, said final positioning induction device having the relatively highest rate of change of error voltage induced in its output winding relative to movement of the object, the output winding of said final positioning induction device being adapted for connection with said driving circuit means and yielding zero induced error voltage when the object is at said final position; and switching means adapted to connect said voltage switching circuit to said driving circuit means until the object has been moved to said offset position and adapted to break the connection between said voltage switching circuit and said driving circuit means and to connect the output winding of said final positioning induction device to said driving circuit means when the output voltage of said voltage switching circuit is zero for movement of the object from said offset position always in the same direction to said final position.

5. In an object position control system, the combination comprising: input signal means adapted to produce input voltages indicative of a preselected final position for the object; a succession of preliminary induction devices each having input windings connected to said input signal means to receive said input voltages and an output winding that is inductively coupled to the input windings and relatively movable with respect to the input windings in response to movement of the object, said preliminary induction devices being mechanically connected to the object and to each other whereby a first of such induction devices has a relatively high rate of change of error voltage induced in its output winding relative to movement of the object and the others of such induction devices have successively lesser rates of change of error voltage of their output windings; an error voltage switching circuit for the output windings of said preliminary positioning induction devices and adapted to produce output voltages which are controlled by the error voltages induced in such output windings; the input windings of said preliminary positioning induction devices being adjusted relative to the output windings thereof to yield zero error voltage at a position of the object offset from said preselected final position and to one side thereof and thereby to produce zero output voltage of said voltage switching circuit at the offset position; driving circuit means for the object adapted for connection to said voltage switching circuit and to which output voltages of said voltage switching circuit are fed; a final positioning induction device having input windings connected to said input signal means to receive said input voltages and a single output winding that is inductively coupled to the input windings and relatively movable with respect to the input windings in response to movement of the object, one of the output winding and the input windings of said final positioning induction device being mechanically coupled with the corresponding winding of said first preliminary positioning induction device whereby said final positioning induction device has the relatively highest rate of change of error voltage induced in its output winding relative to movement of the object, the output winding of said final positioning induction device being adapted for connection with said driving circuit means and yielding zero induced error voltage when the object is at said final position; and switching means responsive to the output voltage of said voltage switching circuit and adapted to connect the voltage switching circuit to said driving circuit means until the object has been moved to said offset position and adapted to break the connection between said switching circuit and said driving circuit means and to connect the output winding of said final positioning induction device to said driving circuit means when the output voltage of said switching circuit is zero, whereby the object is moved first to said offset position and therefrom always in the same direction to said final position.

References Cited in the file of this patent
UNITED STATES PATENTS 2,764,720    Kelling  ---------------- Sept. 25, 1956
2,987,661    Schweitz ---------------- June 6, 1961